(12) United States Patent
Baylis et al.

(10) Patent No.: US 7,660,987 B2
(45) Date of Patent: Feb. 9, 2010

(54) METHOD OF ESTABLISHING A SECURE E-MAIL TRANSMISSION LINK

(76) Inventors: Stephen W. Baylis, 221 Kenwith Ct., Lakeland, FL (US) 33803; S. Todd Baylis, 221 Kenwith Ct., Lakeland, FL (US) 33803

( * ) Notice: Subject to any disclaimer, the term of this patent is extended or adjusted under 35 U.S.C. 154(b) by 663 days.

(21) Appl. No.: 10/977,843

(22) Filed: Oct. 29, 2004

(65) Prior Publication Data

US 2006/0095770 A1 May 4, 2006

(51) Int. Cl.
*H04L 9/00* (2006.01)
(52) U.S. Cl. .................. 713/168; 713/151; 713/152; 713/153; 713/155; 713/170; 713/171; 713/182; 726/1; 726/4; 726/26; 380/277; 380/283; 705/50; 705/51; 705/64; 705/67; 709/225; 709/232; 709/238
(58) Field of Classification Search ............ 713/171, 713/151, 152, 168; 726/26; 380/277, 283
See application file for complete search history.

(56) References Cited

U.S. PATENT DOCUMENTS

| 5,850,444 | A  | * | 12/1998 | Rune .................... 705/79 |
| 6,061,790 | A  | * | 5/2000  | Bodnar ................ 713/171 |
| 6,584,564 | B2 | * | 6/2003  | Olkin et al. ........... 713/152 |
| 6,728,378 | B2 | * | 4/2004  | Garib .................. 380/259 |
| 7,031,473 | B2 | * | 4/2006  | Morais et al. .......... 380/251 |
| 7,278,017 | B2 | * | 10/2007 | Skantze ............... 713/168 |
| 7,325,127 | B2 | * | 1/2008  | Olkin et al. ........... 713/152 |
| 7,353,395 | B2 | * | 4/2008  | Gentry et al. .......... 713/171 |
| 7,380,126 | B2 | * | 5/2008  | Logan et al. .......... 713/176 |
| 7,574,603 | B2 | * | 8/2009  | Swander et al. ........ 713/171 |
| 7,587,051 | B2 | * | 9/2009  | Bisson et al. ......... 380/281 |
| 2002/0143885 | A1 | * | 10/2002 | Ross, Jr. ............ 709/207 |

(Continued)

OTHER PUBLICATIONS

Blake wilson et al, Authenticated Diffie-Hellman Key Agreement Protocols, 1998, pp. 1-23.*

(Continued)

*Primary Examiner*—Nasser G Moazzami
*Assistant Examiner*—Shanto M Abedin
(74) *Attorney, Agent, or Firm*—Arthur W. Fisher, III

(57) ABSTRACT

A method of establishing an e-mail secure transmission link between an initiator and a responder for the transmission of secure e-mail messages over a network comprising creation of a unique initiator designator or number, generation of a unique initiator exchange key component including the unique initiator designator or number, transmission of a request from the initiator to the responder to establish the e-mail secure transmission link and the unique initiator exchange key component, acceptance of the request by the responder to establish the e-mail secure transmission link, creation of a unique responder designator or number, combining of the unique responder designator and the unique initiator exchange key component to create a unique initiator/responder exchange key at the responder site, generation of a unique responder exchange key component including the unique responder designation, transmission of the unique responder exchange key component from the responder to the initiator, combining the unique initiator designator with the unique responder exchange key component to create the unique initiator/responder exchange key at the initiator site and to establish the e-mail secure transmission link to send and receive e-mail between the initiator and the responder exchange with the unique initiator/responder exchange key.

1 Claim, 7 Drawing Sheets

U.S. PATENT DOCUMENTS

2003/0081785 A1* 5/2003 Boneh et al. ............... 380/277
2005/0114664 A1* 5/2005 Davin ........................ 713/170
2006/0010324 A1* 1/2006 Appenzeller et al. ........ 713/171

OTHER PUBLICATIONS

Ran Canetti et al, Analysis of Key-Exchange Protocols and Their Use for Building Secure Channels, EUROCRYPT 2001, pp. 453-474.*

* cited by examiner

E-mail sent to user, what they see before plug-in install;

E-Mail sent back to original sender:

Message sent over the internet;

Encrypted Body of Message:

METHOD OF ESTABLISHING A SECURE E-MAIL TRANSMISSION LINK

BACKGROUND OF THE INVENTION

1. Field of the Invention

An encryption system and method for exchanging sensitive data for e-mail transmission over a network.

2. Description of the Prior Art

The electronic transmission of sensitive data has increased exponentially. Means for protecting such data and information from tampering or interception is vital. Various efforts have been made to ensure that network communications remain private. One such technique for ensuring privacy is the use of cryptography.

Cryptography or encryption mechanisms employs a code to transform data so that only the intended recipient can decode or decipher the message or data.

There are two generally used types of encryption used in network security: symmetrical every time and asymmetrical encryption.

Symmetrical encryption encrypts or encodes data with a single private key (shared secret) for transmission. The transmitted data is then decrypted or decoded using the same key.

Asymmetrical encryption encrypts or encodes data with a single public key. The encrypted or encoded data can only be decrypted or decoded using a different although related private key. Although the two keys are mathematically related, it is "computationally infeasible" to determine or calculate either of the keys simply by knowledge of other keys.

Diffie-Hellman is widely recognized as the first public key encryption technique. This key-exchange algorithm was invented by Whitfield Diffie and Martin Hellman in 1976.

To use the Diffie-Hellman key encryption technique or method, the two parties each select a random number, respectively x and y. Each party transmits A raised to the respective selected random number x or y power. So, one party knows x and $A^y$, and the other party knows y and $A^x$. Each party can calculate $A^{(x*y)}$, since that is $(A^y)^x$ also $(A^x)^y$. Advantageously, an eavesdropper, with knowledge of $A^x$ or $A^y$, cannot calculate $A^{(x*y)}$.

U.S. Pat. No. 5,748,735 shows a method for securing stored files in a system having a plurality of system users with each system user having an associated asymmetric crypto-key with a public key portion and a corresponding private key portion. Each public key portion is accessible to the plurality of system users. Each private key portion has a first private key portion known only to the associated user and a corresponding second private key portion known only to a security server. Data to be stored is identified. A symmetric crypto-key is encrypted with only the second private key portion of a first user crypto-key to form an encrypted key message thereby restricting access to the symmetric crypto-key to only the first user. The symmetric crypto-key is obtained by the first user by applying the first private key portion of the first user crypto-key to decrypt the encrypted key message. The first user encrypts the data with the symmetric crypto-key to form an encrypted file and stores the encrypted file and the encrypted key message.

U.S. Pat. No. 6,061,448 teaches a method and system for secure document delivery over a wide area network. A sender directs a delivery server to retrieve an intended recipient's public key. The delivery server dynamically queries a certificate authority and retrieves the public key. The public key is transmitted from the delivery server to the sender. The sender encrypts the document using a secret key and then encrypts the secret key using the public key. Both encrypted document and encrypted secret key are uploaded to the delivery server and transmitted to the intended recipient. The intended recipient then uses the private key associated with the public key to decrypt the secret key and uses the secret key to decrypt the document.

U.S. Pat. No. 6,061,790 relates to a computer-implemented methodology which allows any user to access a "network client" machine connected to a network. With only the user's password, the client machine is able to initiate a communication session with a server and identify the user to the server as the person who the server expects. The method allows both the client and the server to each identify the other as authentic without compromise in security along the communication link.

U.S. Pat. No. 6,148,404 discusses an authentication method. Specifically, first inspection data, used for inspecting client's authentication data, is stored in a server, while the client also stores first seed data for generating authentication data. The client sends an authentication request to the server and receives an authentication data request from the server. Then the client generates authentication data by enciphering the first seed data using a secret key and sends the enciphered data to the server. The server deciphers the received authentication data by using a public key of the client to generate second inspection data, compares the second inspection data with the first inspection data, and when the keys are coincident, accepts the authentication request and stores the authentication data in place of the first inspection data. Upon receiving the grant, the client stores the authentication data as second seed data in place of the first seed data.

U.S. Pat. No. 6,314,190 describes a system to automatically provide an extra "message recovery" recipient(s) when an encrypted message is generated in the system. The system is typically configured such that the extra recipient or "message recovery agent" (MRA)—an entity which itself has a public key (i.e., a MRA public key)—is automatically added, under appropriate circumstances, as a valid recipient for an encrypted message created by a user. In a corporate setting, for example, the message recovery agent is the "corporate" message recovery agent designated for that company (firm, organization, or other group) and the user is an employee (or member) of that company (or group). In operation, the system embeds a pointer (or other reference mechanism) to the MRA public key into the public key of the user or employee, so that encrypted messages sent to the company's employees from outside users (e.g., those individuals who are not employees of the company) can nevertheless still be recovered by the company. Alternatively, the MRA public key itself can be embedded within the public key of the employee or user (i.e., a key within a key), but typically at the cost of increasing the storage requirement of the user's key. By including in the user's key (e.g., an employee) a pointer to a message recovery agent's key (or the MRA key itself), the system provides a mechanism for assisting a user outside a group (e.g., a user who is outside a particular company) with the task of including in an automatic and non-intrusive manner the key of an additional recipient, such as one intended for message recovery.

U.S. Pat. No. 6,351,536 shows a key method to establish simple encryption communication. A transmitter and a receiver are connected through a network such that they can communicate with each other. In the transmitter, plain text is enciphered using a common key. Ciphertext, together with a key generation program in a public-key cryptosystem, is transmitted from the transmitter to the receiver. In the receiver, a public key and secret key pair is generated in accordance with the key generation program. The public key is transmitted to the transmitter and the secret key is held in the receiver. In the transmitter, the common key is enciphered using the public key transmitted from the receiver. An enciphered common key transmitted to the receiver is deciphered using the held secret key. The ciphertext is deciphered using the deciphered common key.

U.S. Pat. No. 6,367,010 relates to a method for generating secure symmetric encryption/decryption via the Internet to prevent hackers from accessing sensitive and private information. Information is encrypted and decrypted using unique keys in combination with the recipient's PIN numbers. Each unique key corresponds to one recipient and is locally stored on the recipient's computer device. Thus, in order to decrypt information using the present invention, the recipient is required to provide the correct password while using the computer device that includes the unique key.

U.S. Pat. No. 6,571,290 teaches a method and apparatus for simplifying the process of access to a network for a roaming computer user and minimizing servicing a given user wanting to access the network between multiple parties and minimizes the possibility of improper dissemination of email header data.

Publication of US Patent Application 2001/0014156 describes an ID-NIKS using an electronic mail address as the identification information (ID information) of each entity, when generating a common key at each entity. If the electronic mail address of the communicating party does not contain a domain name, the common key is generated after adding the same domain name as the domain name in the electronic mail address of the entity to the electronic mail address of the communicating party.

Publication of US Patent Application 2002/0004899 shows a system and method to improve the security of electronic-mail on the Internet in which a proxy server is arranged between the Internet and a mail server on a LAN and in which a mail server that has received ordinary-text mail from the mail client sends mail that is addressed to a destination outside the LAN to the proxy server as unaltered ordinary text. The proxy server encrypts the ordinary-text mail, attaches the signature of the mail originator, and transmits the encrypted mail with attached signature to the Internet, checks for falsification of encrypted mail with attached signature from the Internet, decrypts the encrypted mail and sends as ordinary-text mail to the mail server if the mail has not been falsified, and denies reception of mail if the mail has been falsified to prevent entry of falsified mail into LAN.

Publication of US Patent Application 2002/0007453 relates to a secure mail transmission system secure encryption means and time date verification for e-mail messages. The system encrypts a sent message at a user station and provides digital authentication and confidential encryption schemes prior to delivery of the secure mail message to the secure mail system over a communication network. The secure mail system unpacks the secure transmission, verifies the contents, provides a time date stamp and virus checking before re-encrypting and re-transmitting the original message. The transmission can be logged and stored for later verification. The recipient of the secure message can be a subscriber or non-subscriber and can use supported e-mail platforms, unsupported e-mail platforms, or unknown e-mail systems and receive the secured message with little or no variation from their typical application interface usage. The system provides secure features including the use of public/private key pairs, hashing algorithms and digital signatures to provide privacy and authentication of the secure mail messages. The private key associated with an individual user need not be stored anywhere.

Publication of US Patent Application 2002/0023213 teaches a method and system for encrypting digital data allowing a sender to encrypt digital data by first attempting to retrieve a locking key for the recipient from a local key store that is stored locally at the sender's computer. If the locking key cannot be retrieved from the local key store, then the encryption system retrieves the recipient's locking key from a key server. The encryption system then encrypts the digital data using the retrieved locking key. The sender can then forward the encrypted digital data to the recipient.

Publication of US Patent Application 2002/0027986 shows an encryption program based directly on symbolic functional composition of polynomial mappings with permutations expressed as polynomial mappings.

Publication of US Patent Application 2002/0032861 teaches a system and method to improve security of electronic mail by an internet service provider including encryption of electronic mail transmitted from the user terminal to the Internet, affixing of a signature to the electronic mail, checking on tampering of encrypted mail with signatures transmitted from the Internet and decryption of the encrypted mail or a like.

Publication of US Patent Application 2002/0101998 describes a system, method and computer readable medium for securely transmitting an information package to an addressee via a network, wherein an addressee is not required to have a private-public key pair before the package is sent. A sending system encrypts the package with a package encryption key and then encrypts a package decryption key with an escrow encryption key obtained from an escrow key manager. The encrypted package and encrypted package decryption key are held in escrow by a server system, until the addressee is issued a new public and private key pair. The server system decrypts the package decryption key, re-encrypts the package with the addressee's new public key and forwards the encrypted package and re-encrypted package decryption key to the addressee's receiving system. The receiving system receives the delivery and decrypts the information package.

Publication of US Patent Application 2002/0143885 shows system, method and computer program product for providing an encrypted e-mail reader and responder is described. The method of distributing and initializing an encrypted electronic mail software application for exchanging secure e-mail can include: obtaining by a first user a license for an e-mail client software application program having public/private encryption; requesting by the first user that a second user download a reader/responder software application program in order to exchange encrypted e-mail between the first user and the second user; downloading and installing the reader/responder software application program by the second user; sending an e-mail by the second user to the first user including embedding an unencrypted public key by using a send key function of the reader/responder software application program; receiving the e-mail from the second user by the first user, wherein the unencrypted public key is embedded in the e-mail; responding by the first user by sending a second e-mail to the first user, where the reader/responder software application program encrypts a message of the second e-mail into an encrypted message using the unencrypted public key of the second user; receiving the second e-mail by the second user with the encrypted message as an attachment from the first user into a third party e-mail software application program, wherein the third party e-mail software application program is different from the reader/responder software application program and the e-mail client software application program; and opening by the second user the attachment to execute the reader/responder software application program operative to allow a user without the e-mail client software to read and respond to encrypted e-mail created and sent from a user having the e-mail client software.

Publication of US Patent Application 2002/0172367 teaches a method for secure electronic information exchange between a sender and a recipient including generating a message at a first entity, generating a message encryption key, encrypting the message using the message encryption key, wrapping the message encryption key using a key agreement algorithm, generating a Java archive file including the encrypted message, the wrapped message encryption key and cryptographic algorithm code including decryption algorithm and key agreement algorithm code, encoding the Java archive file, embedding the encoded Java archive file in an HTML file, and sending the HTML file as an e-mail attachment to said recipient.

Publication of US Patent Application 2003/0041110 discloses a system and computer program for electronic messaging to provide security for communication of electronic messages.

Publication of US Patent Application 2003/0081785 relates to a method and system for encrypting a first piece of information that allows both sender and receiver to compute a secret message key using identity-based information and a bilinear map. The sender computes an identity-based encryption key from an identifier ID associated with the receiver. The identifier ID may include various types of information such as the receiver's e-mail address, a receiver credential, a message identifier, or a date. The sender uses a bilinear map and the encryption key to compute a secret message key which is then used to encrypt a message, producing ciphertext to be sent from the sender to the receiver together with an element. An identity-based decryption is computed by a private key generator based on the ID associated with the receiver and a secret master key. After obtaining the private decryption key from the key generator, the receiver uses it together with the element and the bilinear map to compute the secret message key, which is then used to decrypt and recover the original message.

Publication of US Patent Application 2003/0093674 teaches a method for encrypting data comprising deriving a public key using a first data set provided by a second party; encrypting a second data set with the public key; providing the encrypted third data set to the second party; providing the public key to a third party to allow validation of the first data set such that on validation of the first data set the third party provides an associated private key to the second party to allow decryption of the encrypted second data set.

Additional examples of the prior art are found in U.S. Pat. No. 6,105,131; U.S. Pat. No. 6,233,341; U.S. Pat. No. 6,356,937; U.S. Pat. No. 6,539,093 and U.S. Publication of US Patent Application 2002/0029275.

SUMMARY OF THE INVENTION

The present invention relates to a method of establishing an e-mail secure transmission link between an initiator station or site and a responder station or site for the transmission of secure e-mail messages over a network.

The initiator station or site and the responder station or site each comprises a computer coupled to an input device, an output device and a card or means to connect to other computers over an electronic network. In such a system, data and program files may be input to the computer to read the files and execute the programs therein.

Initially, the sender or initiator initiates a secure link request with a plug-in option to a recipient or responder over the network. The recipient or responder can accept or reject the request to establish the secure link. If the recipient or responder accepts the request, an e-mail message is returned to the initiator or sender for final acceptance to finalize or establish the secure link. Once the e-mail secure transmission link is established, secure e-mail messages are transmitted between the initiator station or site and the responder station or site.

The initiator station or site and the responder station or site include a key generating means to produce an symmetrical key to encode and decode secure e-mail messages for transmission over the network between the initiator station or site and responder station or site. The symmetrical key comprises a Diffie-Hellman encryption key $g^{AB}$ mod p.

The symmetrical keys are produced by the key generating means through the exchange of unique numbers such as A and B created by the initiator station or site and the responder station or site, respectively. The method to establish the e-mail secure transmission link comprises the steps of: creation of the unique initiator designator or number, generation of the unique initiator exchange key component including the unique initiator designator or number, transmitting the request from the initiator to the responder to establish the e-mail secure transmission link and the unique initiator exchange key component, acceptance of the request to establish the e-mail secure transmission link by the responder, creation of the unique responder designator or number, combining of the unique responder designator or number and the unique initiator exchange key component to create the unique initiator/responder encryption key at the responder station or site, generating a unique responder exchange key component including the unique responder designation or number, transmitting a reply accepting the initiator's request and the unique responder exchange key component from the responder to the initiator, acceptance of the reply from the responder to the initiator, combining the unique initiator designator or number with the unique responder exchange key component to create the unique initiator/responder exchange key at the initiator station or site and to establish the e-mail secure transmission link to send and receive e-mail between the initiator and the responder exchange with the unique initiator/responder exchange key. Once the e-mail secure transmission link is established, the initiator and the responder can continue the exchange of secure e-mail messages until either revokes of the e-mail secure transmission link.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method of establishing an e-mail secure transmission link between an initiator and a responder for the transmission of secure e-mail messages over a network.

Figure 1:
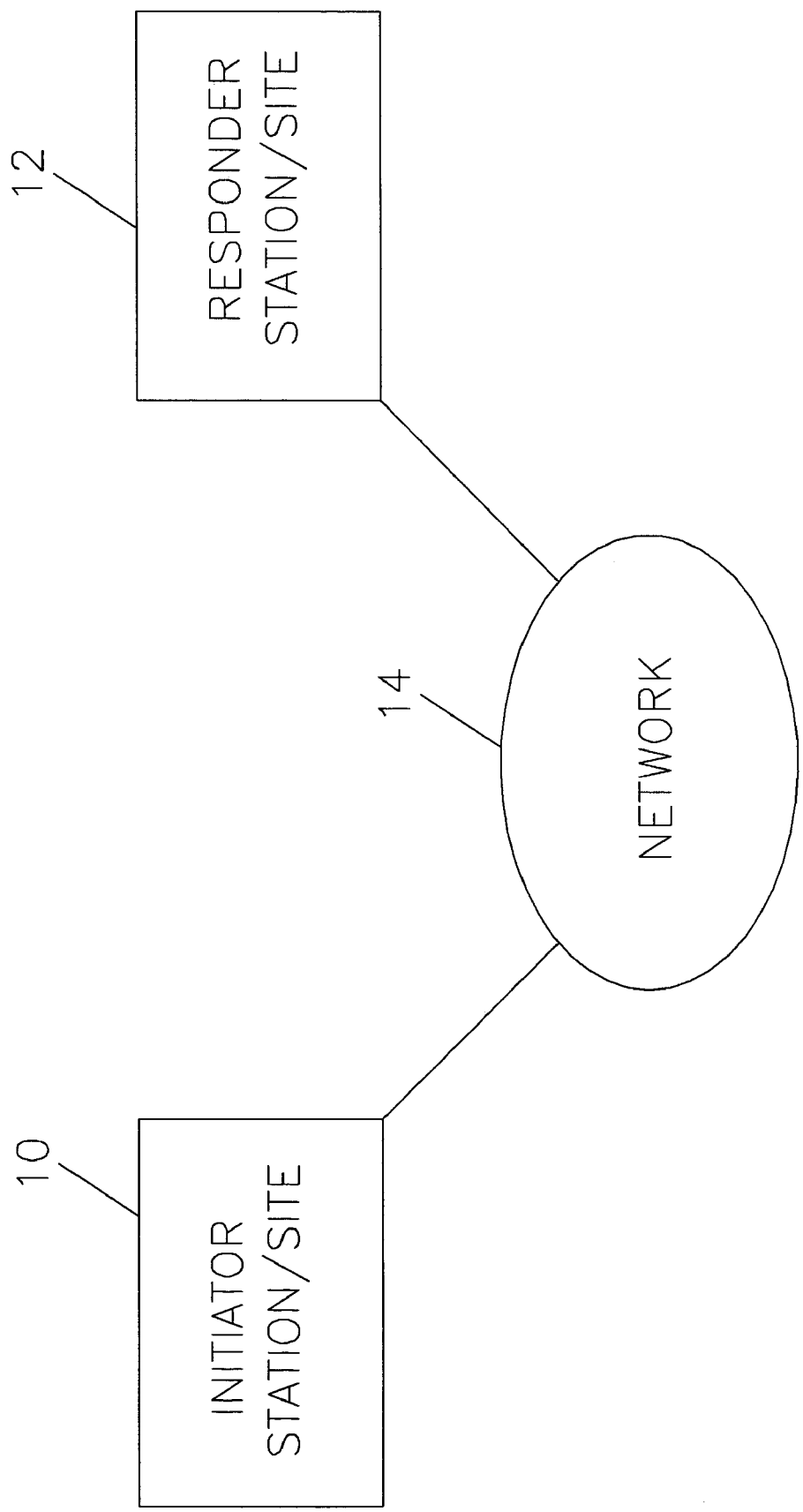
FIG. 1 is a block diagram of an initiator station or site and a responder station or site for use with the method of encryption of the present invention for transmission of secure e-mail messages over a network.

As shown in FIG. 1, an initiator station or site 10 and a responder station or site 12 are coupled through a network 14 to transmit and receive secure e-mail messages over the e-mail secure transmission link established using the method of the present invention.

Figure 2:
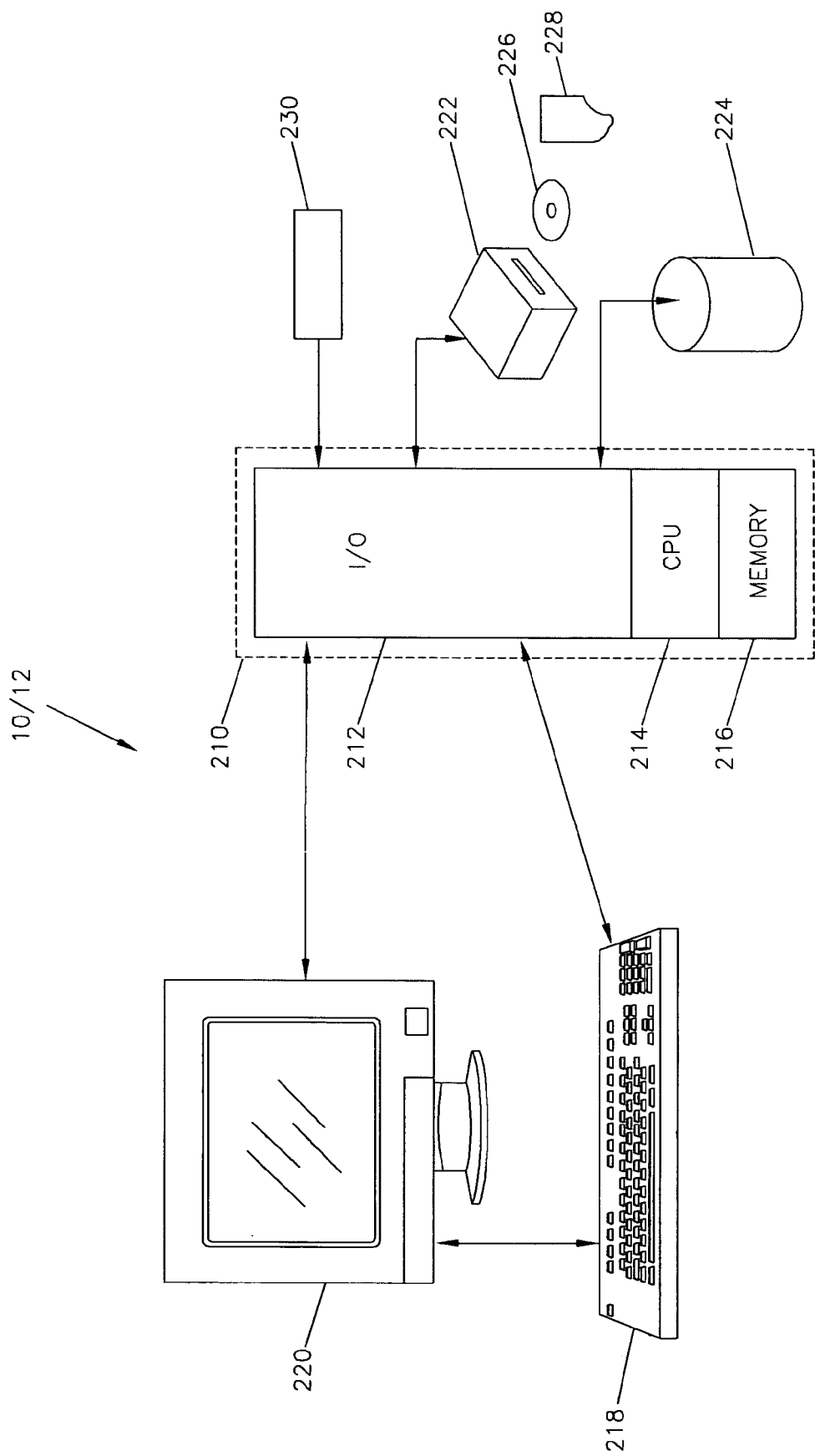
FIG. 2 depicts an initiator station or site/responder station or site for use with the method of encryption of the present invention for transmission of secure e-mail messages over a network.

As shown in FIG. 2, the initiator station or site 10 and the responder station or site 12 each comprises a computer including internal memory coupled to an input device such as a keyboard, an output device such as a CRT display device and printer, a modem and an external storage device. In such a system, data and program files may be input to the computer, to read the files and executes the programs therein. The computer shown in FIG. 2 may comprise a processor 210 having an input/output section (I/O) 212, a central processing unit (CPU) 214 and a memory section 216. The input/output section 212 is connected to a keyboard 218, a display unit 220, a disk drive unit 222 and a disk storage unit 224. Generally, the disk drive unit 222 may comprise a CD-ROM driver unit capable of reading a CD-ROM medium 226, which typically contains programs 228 and data. Computer program products including mechanisms to effectuate the system and methods in accordance with the present invention may reside in the memory section 216, in the disk storage unit 224, or on the CD-ROM medium 226 of such a system. The computer further includes a network interface card 230. Alternately, the disk drive unit 222 may be replaced by a floppy drive unit, a tape drive unit, or other storage medium drive unit.

Figure 3:
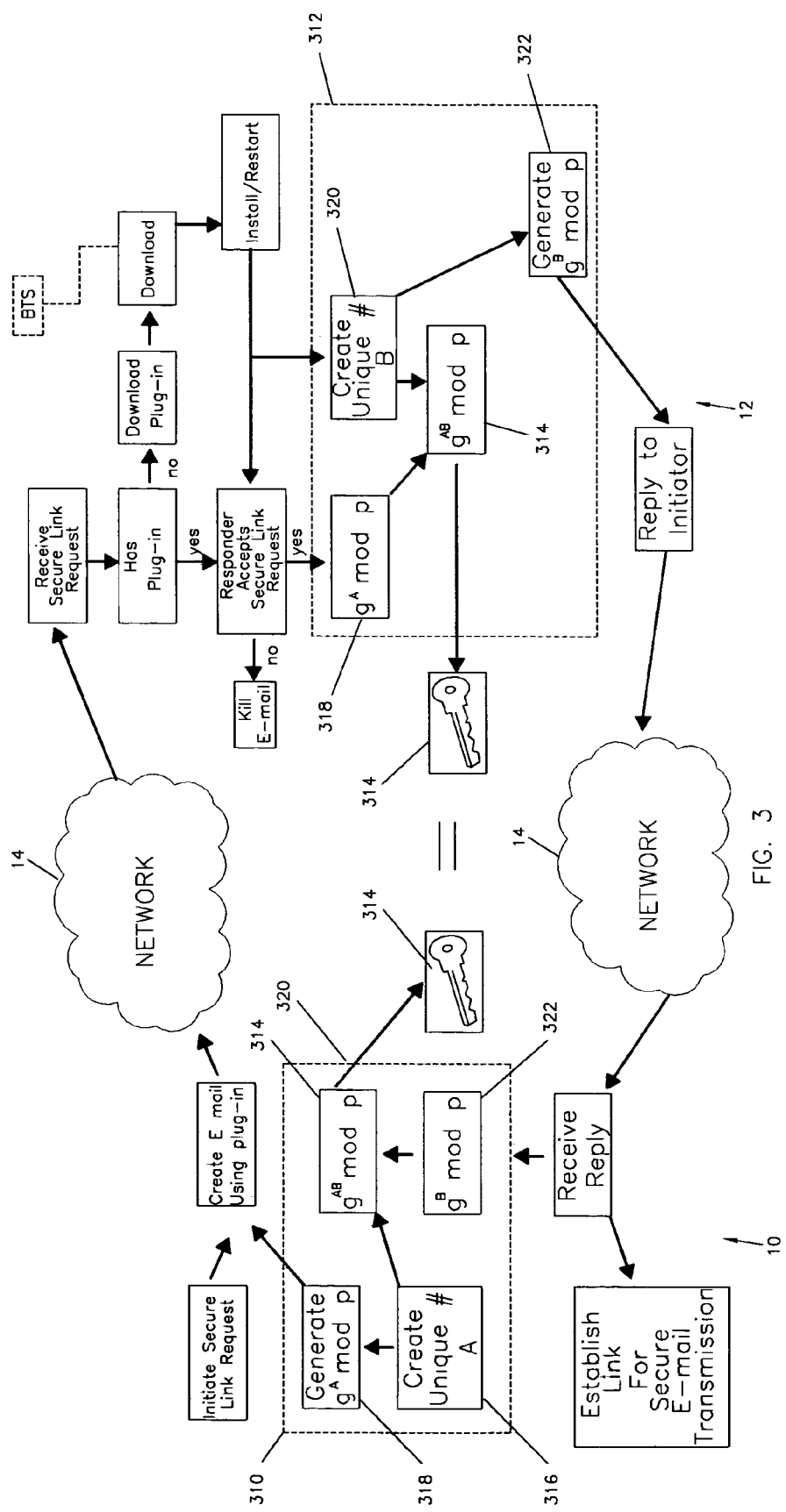
FIG. 3 is a block diagram of the method of establishing an e-mail secure transmission link of the present invention for use with the method of encryption of the present invention for transmission of secure e-mail messages over a network.
Figure 4:
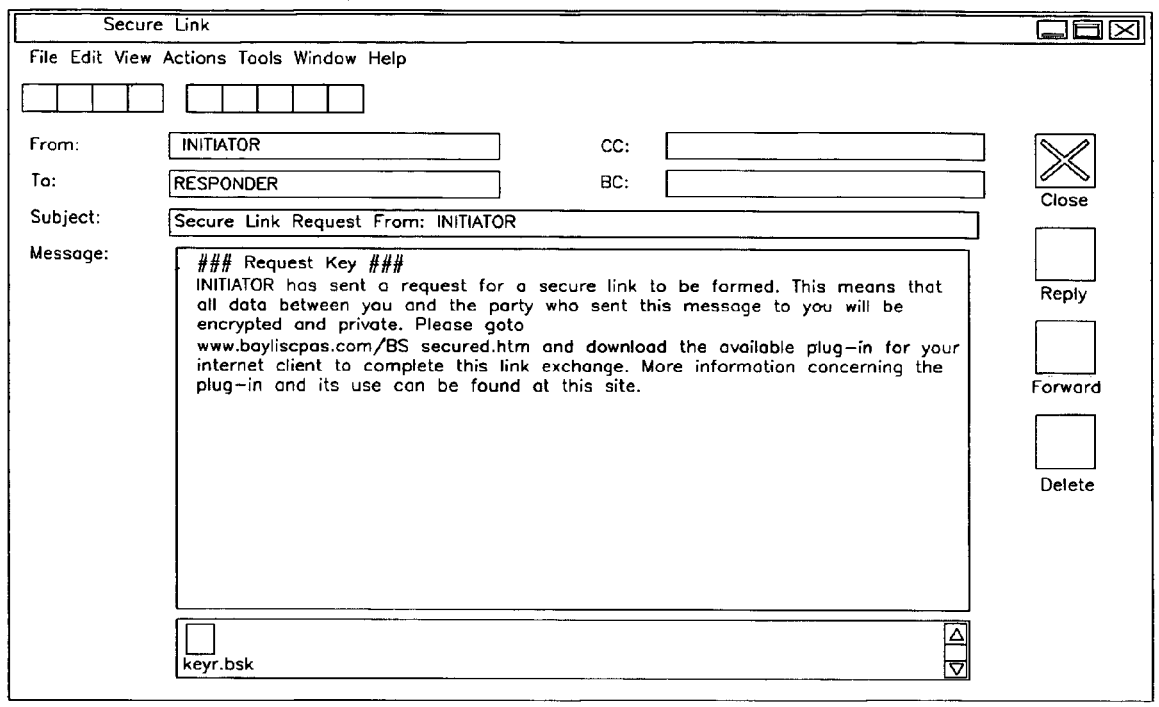
FIG. 4 is a screen of a display unit depicting a secure link request received at the responder site.
Figure 5:
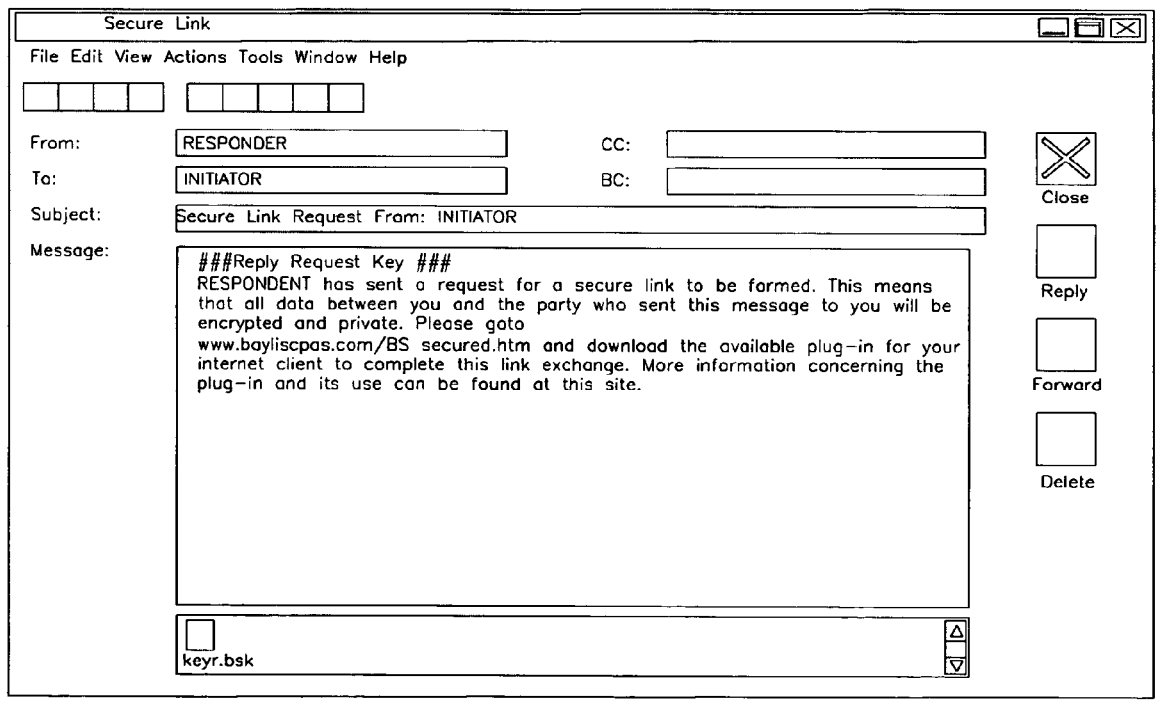
FIG. 5 is a screen of a display unit depicting the acceptance of the secure link request received at the initiator site.
Figure 6:
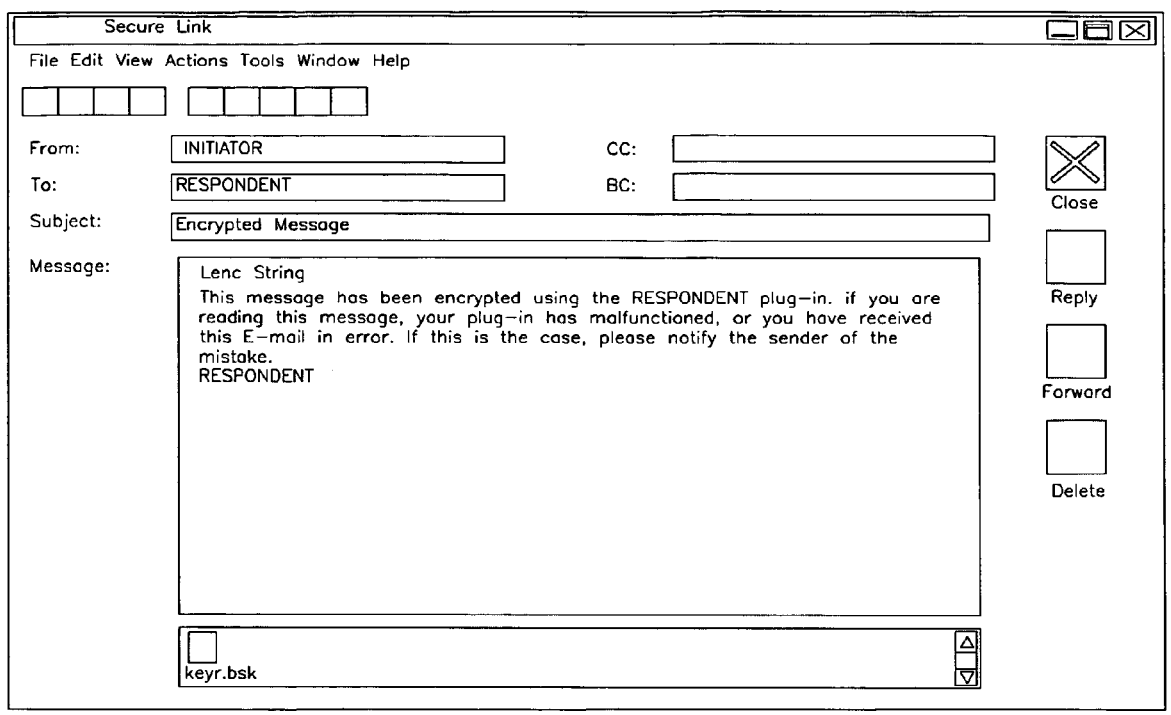
FIG. 6 is a screen of a display unit depicting a plug-in malfunction.
Figure 7:
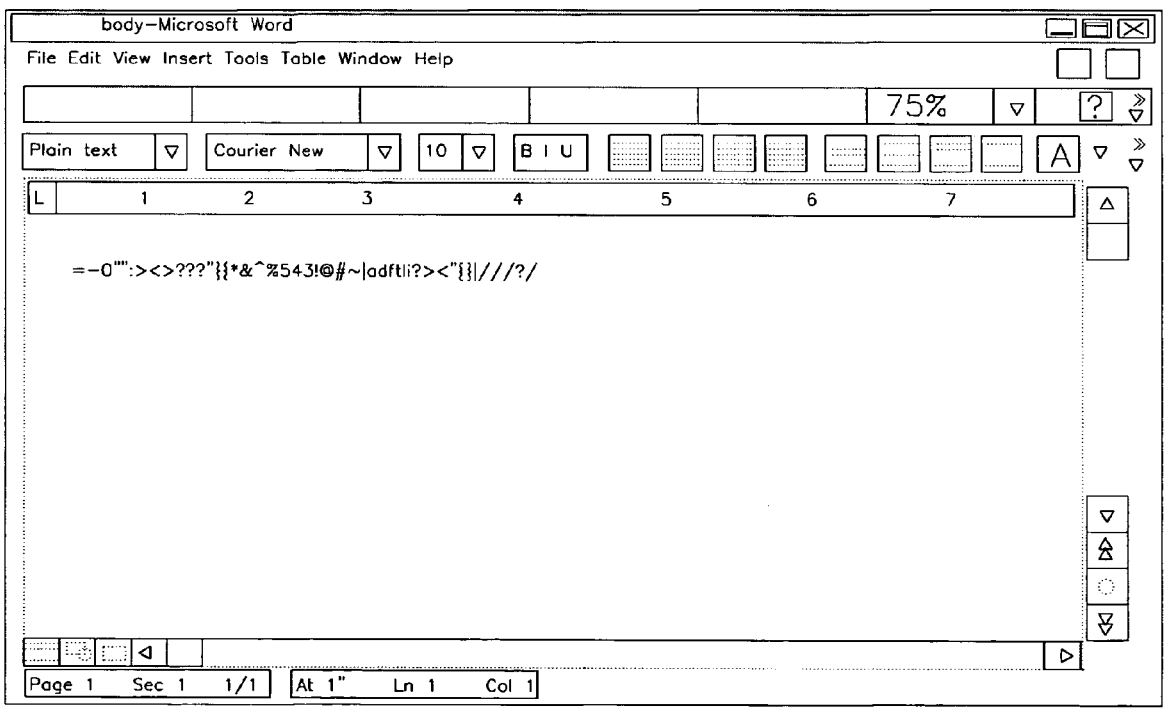
FIG. 7 is an encrypted e-mail message.
Figure 8:
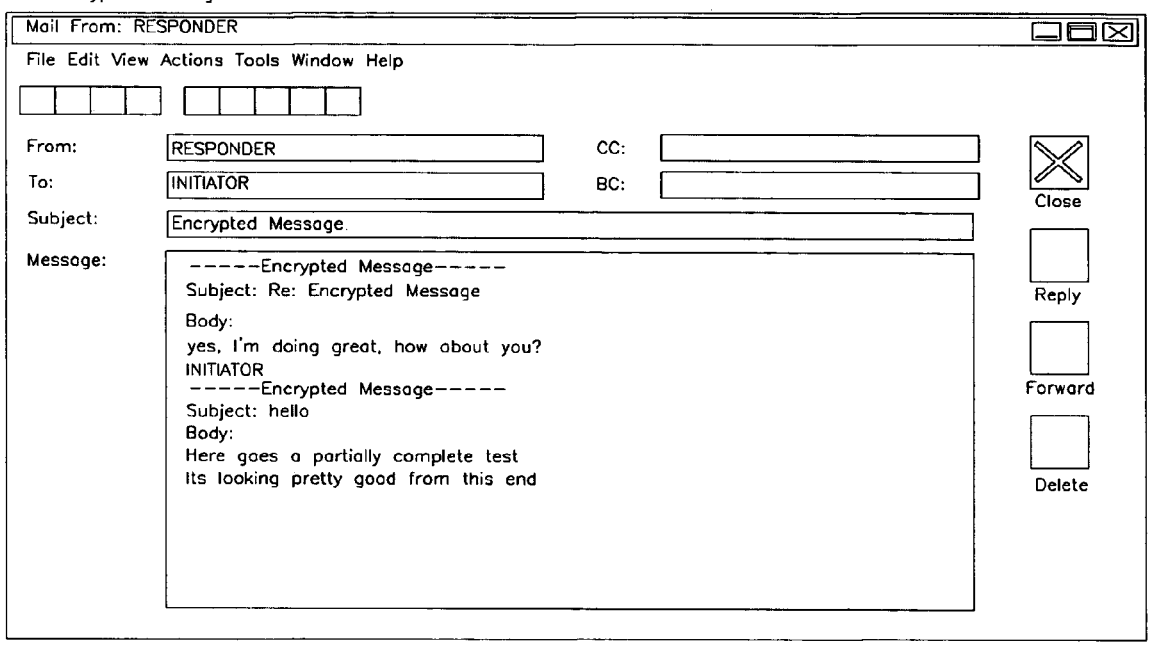
FIG. 8 is a screen of a display unit depicting a decrypted secure e-mail message.

The overall implementation of the method of the present invention is best understood with reference to FIG. 3. Specifically, the sender or initiator at the initiator station or site 10 initiates a secure link request that may include a plug-in option to a recipient or responder at the responder station or site 12 over the network 14 as depicted in the screen shown in FIG. 4. If the responder station or site 12 does not have a plug-in, the recipient or responder downloads the necessary software required to establish the link. The recipient or responder can then accept the request to establish the secure link. If the recipient or responder accepts the request, an e-mail message is returned to the initiator or sender for final acceptance as depicted in the screen shown in FIG. 5 to finalize or establish the secure link. Once the e-mail secure transmission link is established, secure e-mail messages are transmitted between the initiator station or site 10 and the responder station or site 12 as depicted in the screen shown in FIGS. 7 and 8. FIG. 6 shows a screen depicting a message where plug-in has malfunctioned.

As shown in FIG. 3, the initiator station or site 10 and the responder station or site 12 include a key generating means generally indicated as 310 and 312 respectively to produce an symmetrical key indicated as 314 to encode and decode secure e-mail messages for transmission over the network 14 between the initiator station or site 10 and responder station or site 12. The symmetrical key 314 comprises a Diffie-Hellman encryption key $g^{AB}$ mod p as described hereinafter.

The symmetrical keys 314 are produced by the key generating means 310 through the exchange of unique numbers such as A and B created by the initiator station or site 10 and the responder station or site 12 respectively. The process for producing the symmetrical keys 314 comprises the steps of creating a unique initiator designator or number 316, generating a unique initiator exchange key component 318 including the unique responder designator or number 320, transmission of the unique initiator exchange key component 318 from the initiator station or site 10 to the responder station or site 12, creating a unique responder designator or number 320, combining the unique responder designator or number 320 and the unique initiator exchange key component 318 to create the unique initiator/responder encryption key 314 at the responder station or site 12, generating a unique responder exchange key component 322 including the unique responder designator or number 320, transmission of the unique responder encrypting key component 322 from the responder station or site 12 to the initiator station or site 10, combining the unique initiator designator or number 316 with the unique responder exchange key component 322 to create the unique initiator/responder encryption key 314 at the initiator station or site 10. The unique initiator/responder encryption key 314 can then be used to send and receive secure e-mail messages over the e-mail secure transmission between the initiator station or site 10 and the responder station or site 12.

Figure 9:
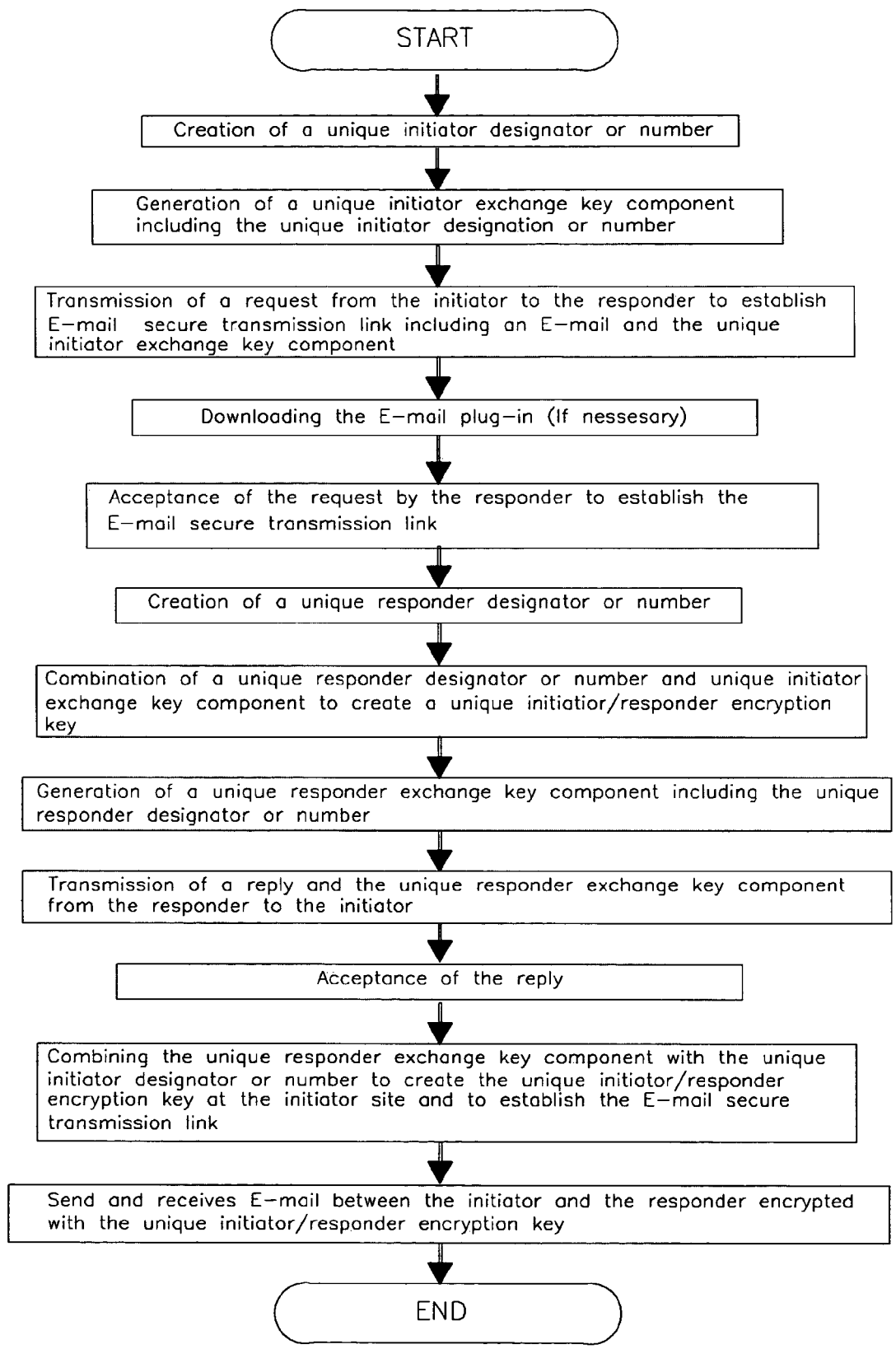
FIG. 9 is a flow chart depicting the method of establishing the e-mail secure transmission link of the present invention for use and method of encryption for transmission of secure e-mail messages over a network.

The entire method for establishing the e-mail secure transmission link between an initiator and a responder for the transmission of secure e-mail messages over the network 14 is best understood with reference to FIG. 9. In particular, the method to establish the e-mail secure transmission link comprises the steps of: creation of the unique initiator designator or number 316, generation of the unique initiator exchange key component 318 including the unique initiator designator or number 316, transmitting the request from the initiator to the responder to establish the e-mail secure transmission link including an e-mail plug-in and the unique initiator exchange key component 318, downloading the e-mail plug-in of necessity, acceptance of the request to establish the e-mail secure transmission link by the responder, creation of the unique responder designator or number 320, combining of the unique responder designator or number 320 and the unique initiator exchange key component 318 to create the unique initiator/responder encryption key 314 at the responder station or site 12, generating a unique responder exchange key component 322 including the unique responder designation or number, transmitting a reply accepting the initiator's request and the unique responder exchange key component 322 from the responder to the initiator, acceptance of the reply from the responder to the initiator, combining the unique initiator designator or number 318 with the unique responder exchange key component 322 to create the unique initiator/responder encryption key 314 at the initiator station or site 10 and to establish the e-mail secure transmission link to send and receive e-mail between the initiator and the responder encrypted with the unique initiator/responder encryption key 314. Once the e-mail secure transmission link is established, the initiator and the responder can continue the exchange of secure e-mail messages until either revokes of the e-mail secure transmission link.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method to establish the e-mail secure transmission link between an initiator site and a responder site, each site comprising a key generating means to produce a symmetrical key to encode and decode secure e-mail messages for transmission over a network between the initiator site and responder site wherein the symmetrical keys are produced by the key generating means through the exchange of unique numbers created at the initiator site and the responder site, the method comprising the steps of: creating a unique initiator number, generating of the unique initiator exchange key component including the unique initiator number at the initiator site, transmitting the request from the initiator site to the responder site to establish the e-mail secure transmission link including an e-mail plug-in and the unique initiator exchange key component, downloading the e-mail plug-in of necessity and accepting the request to establish the e-mail secure transmission link at the responder site, creating a unique responder number, combining of the unique responder number and the unique initiator exchange key component to create the unique initiator/responder encryption key at the responder site, generating a unique responder exchange key component including the unique responder number at the responder site, transmitting a reply accepting the initiator's request and the unique responder exchange key component from the responder site to the initiator site, accepting the reply from the responder site at the initiator site, combining the unique initiator number with the unique responder exchange key component to create the unique initiator/responder encryption key at the initiator site and establishing the e-mail secure transmission link to send and receive e-mail between the initiator site and the responder site encrypted with the unique initiator/responder encryption key establishing the e-mail secure transmission link wherein the initiator site and the responder site are capable of exchanging secure e-mail messages and revoking the e-mail secure transmission link at either the initiator site or the responder site.

\* \* \* \* \*